(12) United States Patent
Williams et al.

(10) Patent No.: US 10,394,698 B2
(45) Date of Patent: Aug. 27, 2019

(54) JAVASCRIPT PATH ENUMERATION

(71) Applicant: EntIT Software LLC, Sunnyvale, CA (US)

(72) Inventors: Kevin Allen Williams, Alpharetta, GA (US); Steve Alan Millar, Dawsonville, GA (US); Stephen Daniel Hardeman, Alpharetta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 20 days.

(21) Appl. No.: 15/686,388

(22) Filed: Aug. 25, 2017

(65) Prior Publication Data

US 2018/0074943 A1    Mar. 15, 2018

Related U.S. Application Data

(60) Provisional application No. 62/385,540, filed on Sep. 9, 2016.

(51) Int. Cl.
| | | |
|---|---|---|
| *G06F 9/44* | (2018.01) | |
| *G06F 11/36* | (2006.01) | |
| *G06F 8/75* | (2018.01) | |
| *G06F 21/56* | (2013.01) | |
| *G06F 21/57* | (2013.01) | |

(52) U.S. Cl.
CPC .......... *G06F 11/3676* (2013.01); *G06F 8/75* (2013.01); *G06F 11/3604* (2013.01); *G06F 11/3688* (2013.01); *G06F 21/566* (2013.01); *G06F 21/577* (2013.01)

(58) Field of Classification Search
CPC .... G06F 8/75; G06F 11/3604; G06F 11/3688; G06F 21/566; G06F 21/577
See application file for complete search history.

(56) References Cited

U.S. PATENT DOCUMENTS

| 8,868,533 | B2 * | 10/2014 | Powell | ............... G06Q 30/0241 707/705 |
| 8,949,994 | B2 | 2/2015 | Amit et al. | |
| 9,098,636 | B2 | 8/2015 | DeAngelis et al. | |

(Continued)

FOREIGN PATENT DOCUMENTS

| EP | 3190536 | 7/2017 |
| WO | WO-2016060110 | 4/2016 |

OTHER PUBLICATIONS

Kartik Bajaj et al., Dompletion: DOM-aware JavaScript code completion, ACM, 2014, retrieved online on May 13, 2019, pp. 43-54. Retrieved from the Internet: <URL: http://delivery.acm.org/10.1145/2650000/2642981/p43-bajaj.pdf?>. (Year: 2014).*

(Continued)

*Primary Examiner* — Hanh Thi-Minh Bui (57) ABSTRACT

In one example in accordance with the present disclosure, a method may include receiving code corresponding to an HTML page structure including a plurality of executable JavaScript code and enumerating a branching path in the JavaScript code. The method may include determining a branch of the branching path that would not execute during normal operation of a browser executing the JavaScript code. The method may also include generating an artificial condition for the branch and executing the branch using the artificial condition.

14 Claims, 5 Drawing Sheets

(56) References Cited

U.S. PATENT DOCUMENTS

| | | |
|---|---|---|
| 9,135,147 B2 | 9/2015 | Artzi et al. |
| 9,208,235 B1 | 12/2015 | Liu |
| 2009/0089759 A1 | 4/2009 | Rajan et al. |
| 2009/0187918 A1* | 7/2009 | Chen .................. G06F 21/52 |
| | | 719/313 |
| 2013/0219368 A1 | 8/2013 | Carteri et al. |
| 2015/0163237 A1 | 6/2015 | Pistoia et al. |
| 2015/0186342 A1 | 7/2015 | Tripp |

OTHER PUBLICATIONS

Aydin, A., et al., Automated Test Generation From Vulnerability Signatures, University of California, Jan. 29, 2014, 10 pages.

Duersen, A.V., et al., Crawl-based Analysis of Web Applications: Prospects and Challenges, Delft University of Technology, Technical Report Series, Report TUD-SERG2014-015, Sep. 15, 2014. 14 pages.

Haroon, S.M., et al., Plug-ins an Added Component for Automatic Testing of Modern Web Applications, IJARCET, vol. 4, Issue 2, Feb. 2015, pp. 562-567.

Mesbah, A., et al., Invariant-based Automatic Testing of Modern Web Applications, Delft University of Technology, Technical Report Series, Report TUD-SERG-2011-003, 2011, 24 pages.

Saxena, P., et al., A Symbolic Execution Framework for JavaScript, University of California, May 11, 2010, 18 pages.

Zheng, Y., et al., Path Sensitive Static Analysis of Web Applications for Remote Code Execution Vulnerability Detection, Purdue University, Aug. 17, 2012, 10 pages.

European Patent Office, Extended European Search Report for Appl. No. 17189702.8 dated Nov. 3, 2017 (6 pages).

\* cited by examiner

JAVASCRIPT PATH ENUMERATION

CROSS REFERENCE TO RELATED APPLICATION

This application claims the benefit under 35 U.S.C. § 119(e) of U.S. Provisional Application Ser. No. 62/385,540, filed Sep. 9, 2016, which is hereby incorporated by reference.

BACKGROUND

Web pages/applications may be tested to ensure for sources of exploitable vulnerabilities. One source of these vulnerabilities may be executable JavaScript code. Because these applications are often large, complex and interconnected with web services, JavaScript analysis may be performed to expose attackable entry points.

BRIEF DESCRIPTION OF THE DRAWINGS

The following detailed description references the drawings, wherein.

DETAILED DESCRIPTION

During normal operation, a web page in a browser may execute JavaScript code and react to timer events, live user events (such as keypresses and mouse clicks), etc. The resultant call chains and code flows may constitute a set of allowed or intended execution. As an example, for an "if-else" branching path in the JavaScript code, the code may follow the path dictated by current program states. It may run the "if" or the "else" but not both.

This normal code flow is correct program operation, but may not include possible attack points from malicious actors. Correct browser execution, however, may not be a constraint for these actors. Malicious actors may analyze source code and make inferences about how the code interacts with the web server to determine unintended execution of the JavaScript code. An example is the same "if-else" mentioned above. Intended execution of the browser may dictate that the "if" path is to be taken in a certain context. This intended path may be referred to as a "normal" path. Both code paths, however, may contain an AJAX network call to the server and this AJAX call may be an entry point that could be exploited. A skilled attacker could modify the set of attacks to try by following the unintended path and craft the network request that would have occurred if the code went down the "else" instead of the "if" path. This unintended path may be referred to as a "dark path."

Javascript path enumeration techniques described herein may be useful for automatically exploring these dark paths that would not happen during normal browser operation but which could be used as an attack point by an intruder if the dark paths were executed. An example method for JavaScript path enumeration may include receiving code corresponding to an HTML page structure including a plurality of executable JavaScript code and enumerating a branching path in the JavaScript code. The method may include determining a branch of the branching path that would not execute during normal operation of a browser executing the JavaScript code. The method may also include generating an artificial condition for the branch and executing the branch using the artificial condition.

Figure 1:
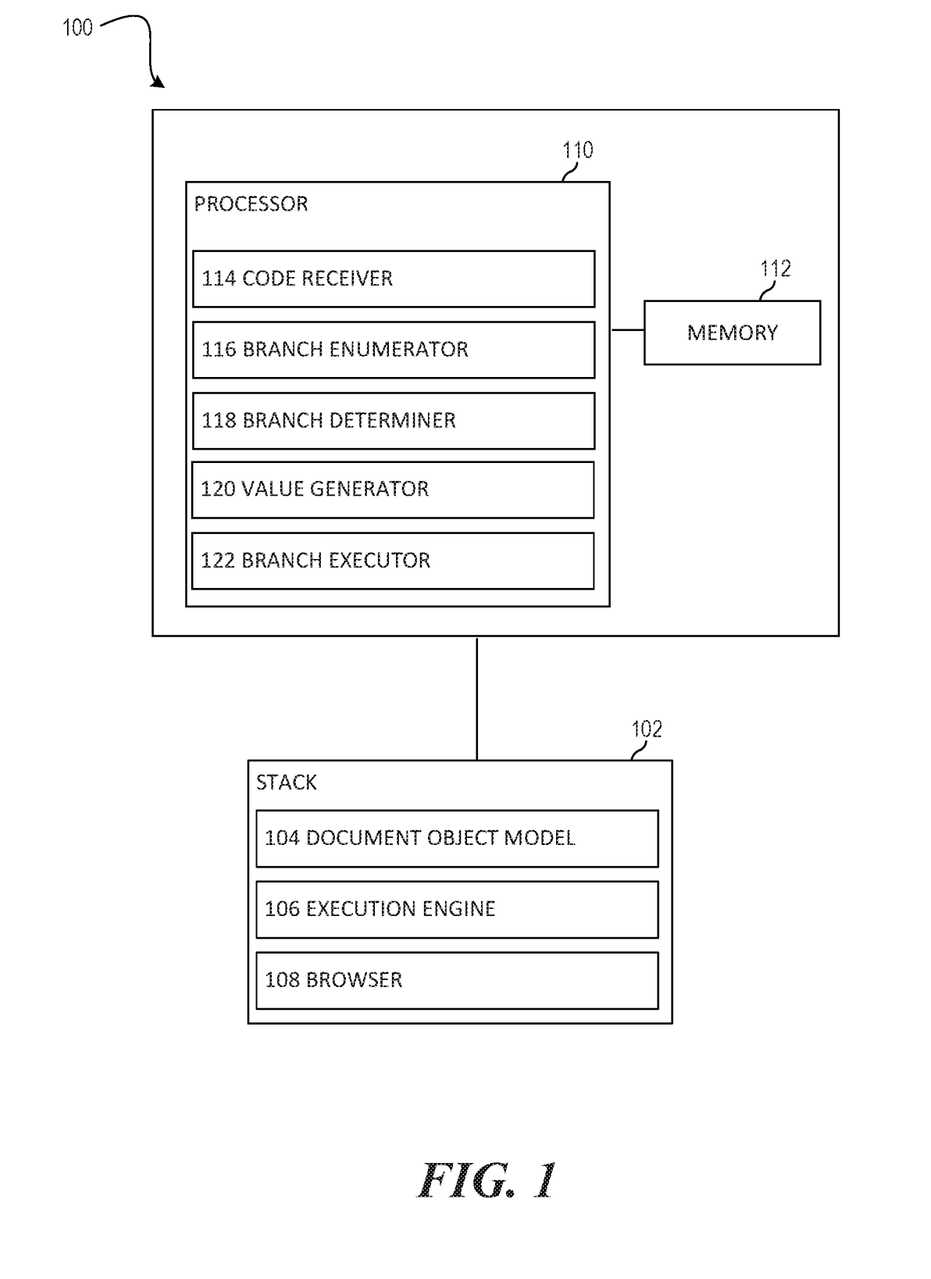
FIG. 1 is a block diagram of an example environment for JavaScript path enumeration.

FIG. 1 is a block diagram of an example environment 100 in which JavaScript path enumeration may be useful. Environment 100 may include a stack 102 with a document object model 104, an execution engine 106 and a browser 108. A document object model (DOM) 104 is an internal representation of the Hyper Text Markup Language (HTML) page structure, i.e., it is a tree structure that mirrors the web page. The initial page may come from a web server and may be rendered into a browser as HTML and other code, such as JavaScript (JS) code, which may execute after the HTML page loads. Once rendered, the page may be interacted with (for example by clicks, keypresses, and timer events, etc.) causing the page to change. These interactions may cause changes the DOM 104 to in the form of additions to the DOM, deletions from the DOM, alterations of the DOM, etc. These changes to the DOM may be referred to as "DOM mutations."

The execution engine 106 may execute the code from the HTML page structure. For example, execution engine 106 may be a JavaScript engine that executes JavaScript code. The browser 108 may be used to interpret the HTML page structure and executable code that is represented by the DOM 104. In some aspects, the browser 108 may be a "headless" browser that emulates a human operator and also internally tracks DOM state changes. The headless browser may make calls to a server using the Asynchronous JavaScript and XML protocol (AJAX). The headless browser may emulate how a traditional browser acts but may not render a graphical user interface (GUI). By not rendering a GUI, environment 100 may increase the speed of a security scan/analysis. The browser 108 may also have access to certain values and actions that are prohibited and/or hidden by a traditional browser.

Environment 100 may also include a processor 110 and a memory 112 that may be coupled to each other through a communication link (e.g., a bus). Processor 110 may include a Central Processing Unit (CPU) or another suitable hardware processor. In some examples, memory 112 stores machine readable instructions executed by processor 110. Memory 112 may include any suitable combination of volatile and/or non-volatile memory, such as combinations of Random Access Memory (RAM), Read-Only Memory (ROM), flash memory, and/or other suitable memory. Memory 112 may also include a random access non-volatile memory that can retain content when the power is off.

Memory 112 may store instructions to be executed by processor 110 including instructions for implementing code receiver 114, branch enumerator 116, branch determiner 118, value generator 120, branch executor 122 and/or other components. Furthermore, in FIG. 1 and other Figures described herein, different numbers of components or entities than depicted may be used.

Processor 110 may execute instructions of code receiver 114 to receive code corresponding to an HTML page structure. An initial Document Object Model (DOM) may also be received and/or created corresponding to an HTML page structure. Processor 110 may execute instructions of branch enumerator 116 to enumerate a plurality of branching paths of the executable JavaScript code included in the HTML page structure. Processor 110 may execute instructions of branch determiner 118 to determine, for each branching path in the plurality, whether any branches of the branching path are not intended to execute during runtime conditions. The plurality of branching paths may include "normal" paths that are intended to be executed during runtime conditions of a browser executing the JavaScript code. The plurality of branching paths may also include "dark" paths that are not intended to be executed during runtime conditions of the browser executing the JavaScript code.

In some aspects the dark paths may include a value that would prevent the branch from executing during correct browser execution. For example, the JavaScript code may include a hard-coded variable with a false value and an "if/else" statement that branches to "else" based on that value. Accordingly, the "else" path is the normal path and the "if" path is the dark path. During correct browser execution, the JavaScript code should take this normal path regardless of user input or other runtime conditions. However, a malicious actor may use the dark path as an attack point. Dark paths may contain code that has runtime effects on the DOM. Potentially, these code paths can also emit AJAX calls to the server. Branch determiner may determine a break point during executing the branch using the artificial condition, where the JavaScript code interacts with a web server and/or makes an AJAX call.

Examining both the "if" and "else" path without regard to the runtime condition allows analysis of these dark paths and the resultant DOM mutations, network calls, dynamic JS changes, etc. Moreover, examining each of the possible paths may allow for the identification and execution of normal paths that are not obvious because, for example, some of the inputs that a user could access are not known. In the above example, the branch determiner 118 may determine that the first branch corresponds to a hard coded value (in this case the "false" value mentioned above) in the HTML page structure and determine that the first branch has a value other than the hard coded value. In some aspects, the branch determiner 118 may determine that the first branching path has two possible branches and that a first possible branch of the two possible branches is not intended to execute during runtime conditions. The branch determiner 118 may identify the first possible branch as a dark path.

Put another way, code receiver 114 may receive JavaScript code with a plurality of branch paths. Branch enumerator 116 may enumerate each branch of the plurality of branching paths in the JavaScript code. Branch determiner 118 may determine, for each branch, whether the branching path would execute during normal operation of a browser executing the JavaScript code. Branch determiner 118 may flag each branch of the branching path that would execute during normal operation as a normal path and flag each branch of the branching path that would not execute during normal operation as a dark path.

Processor 110 may execute instructions of value generator 120 to generate, for each branch not intended to be executed during runtime conditions, an unintended value for the branch. In the above example, the unintended value generated by value generator 120 may be a "true" value that cause the if/else statement to branch to "if" based on the value. Processor 110 may execute instructions of branch executor 122 to execute a first branch not intended to be executed during runtime conditions using the unintended value. Branch executor 122 may also execute branches that are intended to be executed during runtime conditions using the intended value.

Branch executor 122 may execute both normal and/or dark paths using the actual JavaScript code representing the actual client side source code, but using artificial runtime conditions. In this manner, adjustments to the DOM, AJAX calls and subsequent JS mutations may be recorded and analyzed. In JavaScript, the code can change itself and thereby lead to more correct paths and more dark paths.

Branch executor 122 may execute branches using the browser 108. The browser 108 may be a headless browser that emulates functionality of a browser without generating a graphic user interface. The browser 108 may also include a plurality of operational modes, each operational mode corresponding to the simulation of a different browser environment. Branch executor 122 may execute branches using the unintended value in a plurality of operational modes. The DOM may be adjusted based on the execution of the branch using the unintended value. The adjustment of the DOM is discussed in further detail below, in reference to FIG. 3 and method 300.

Figure 2:
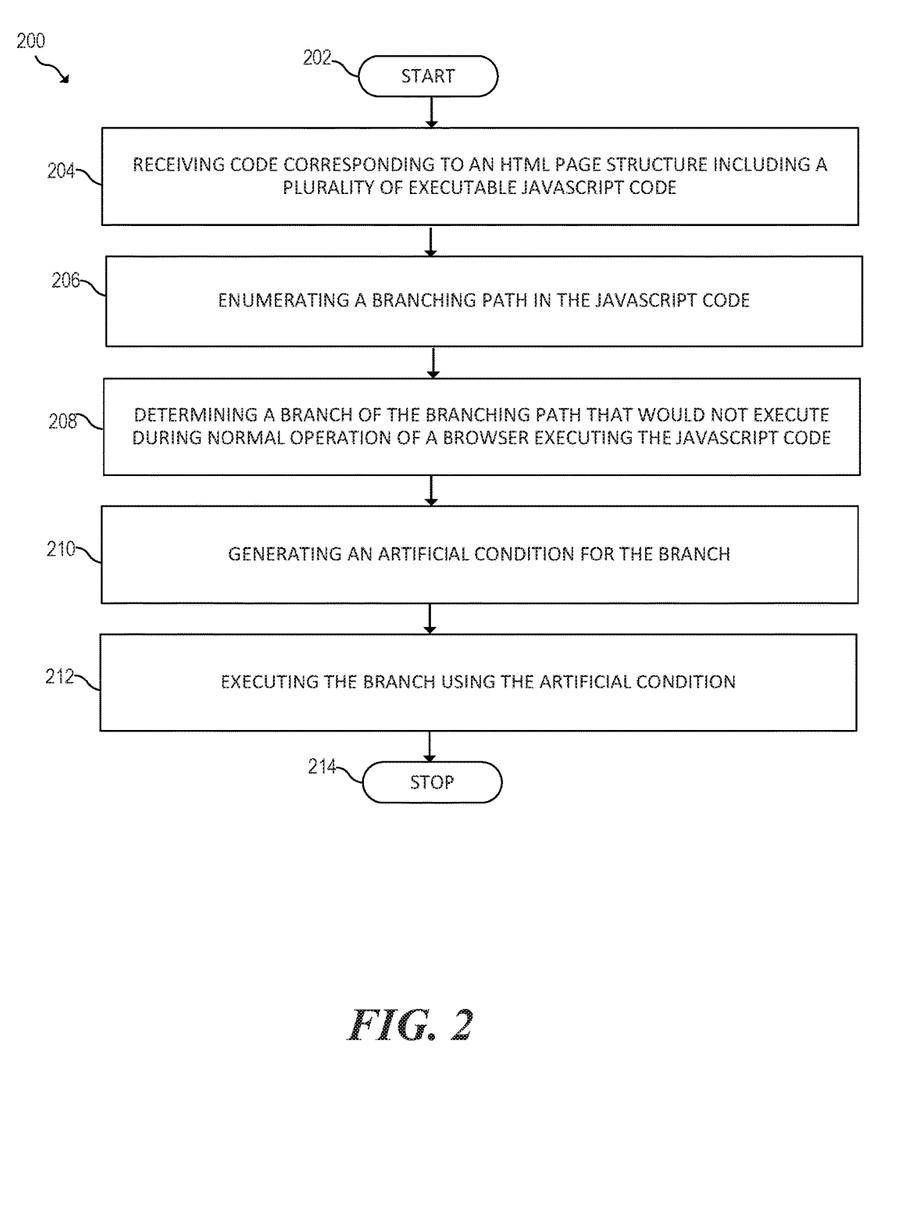
FIG. 2 is a flowchart of an example method for JavaScript path enumeration.

FIG. 2 is a flowchart of an example method 200 for JavaScript path enumeration. Method 200 may be described below as being executed or performed by an environment, for example environment 100 of FIG. 1, or a system, for example, system 500 of FIG. 5 described below. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include receiving code corresponding to an HTML page structure including a plurality of executable JavaScript code. At block 206, the method may include enumerating a branching path in the JavaScript code. At block 208, the method may include determining a branch of the branching path that would not execute during normal operation of a browser executing the JavaScript code.

In some aspects, determining a branch of the branching path that would not execute during normal operation may include identifying a first branch of the branching path corresponding to a hard coded value in the HTML page structure and determining that the branch of the branching path that would not execute during normal operation of a browser executing the JavaScript corresponds to a value other than the hard coded value.

In some aspects, determining a branch of the branching path that would not execute during normal operation may include determining that the branching path has two possible branches, determining that a first branch of the possible branches would not execute during normal operation of a browser executing the JavaScript code and identifying the first branch as a dark path.

At block 210, the method may include generating an artificial condition for the branch and at block 212, the method may include executing the branch using the artificial condition. The execution may be performed by a headless browser that emulates functionality of a browser without generating a graphic user interface. The browser may a plurality of operational modes, each operational mode corresponding to the simulation of a different browser environment. The branch may be executed in the plurality of operational modes. Method 200 may eventually continue to block 214, where method 200 may stop.

Figure 3:
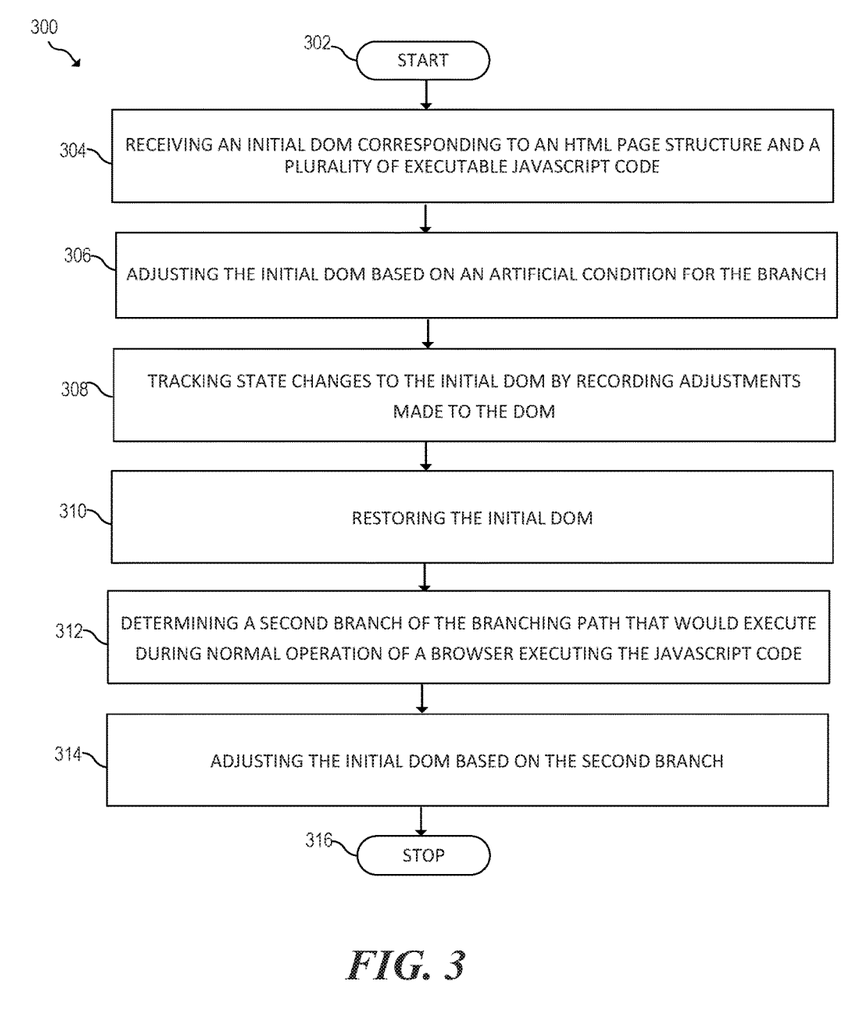
FIG. 3 is a flowchart of another example method for document object model adjustment and enumeration.

FIG. 3 is a flowchart of an example method 300 for DOM tracking and adjustment. Method 300 may be described below as being executed or performed by an environment, for example environment 100 of FIG. 1, or a system, for example, system 500 of FIG. 5 described below. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302 and continue to block 304, where the method 300 may include receiving an initial DOM corresponding to an html page structure and a plurality of executable JavaScript code. The HTML page structure and plurality of executable JavaScript code may be related to or the same as the HTML page structure and plurality of executable JavaScript code discussed in block 202 above in reference to method 200 and FIG. 2.

At block 306, the method may include adjusting the initial DOM based on an artificial condition for the branch (such as the artificial condition in block 210 of method 200 in FIG. 2). At block 308, the method may include tracking state changes to the initial DOM by recording adjustments made to the DOM. Tracking state changes may include tracking the adjustment to the initial DOM based on executing the branch using the artificial condition. At block 310, the method may include restoring the initial DOM. By restoring the initial DOM, the DOM can then be adjusted based on a different branch. In this manner, the method 300 may simulate the different possible branches that can be created. Restoring the initial DOM At block 312 the method may include determining a second branch of the branching path that would execute during normal operation of a browser executing the JavaScript code. At block 314, the method may include adjusting the initial DOM based on the second branch. Method 300 may eventually continue to block 316, where method 300 may stop.

Figure 4:
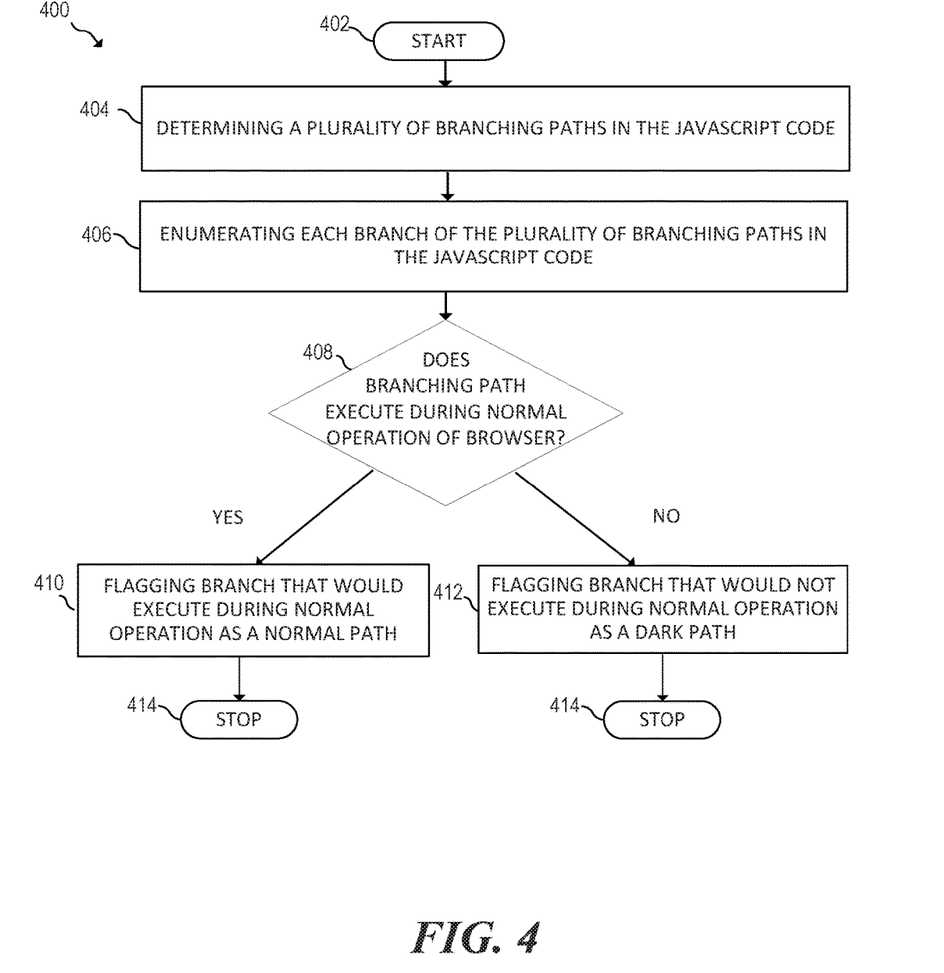
FIG. 4 is a flowchart of an example method for JavaScript path enumeration.

FIG. 4 is a flowchart of an example method 400 for JavaScript path enumeration. Method 400 may be described below as being executed or performed by an environment, for example environment 100 of FIG. 1, or a system, for example, system 500 of FIG. 5 described below. Other suitable systems and/or computing devices may be used as well. Method 400 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently or in a different order than shown in FIG. 4. Method 400 may include more or less blocks than are shown in FIG. 4. Some of the blocks of method 400 may, at certain times, be ongoing and/or may repeat.

Method 400 may start at block 402 and continue to block 404, where the method 400 may include determining a plurality of branching paths in the JavaScript code. At block 406, the method may include enumerating each branch of the plurality of branching paths in the JavaScript code. At block 408, the method may include determining, for each branch, whether the branching path that would not execute during normal operation of a browser executing the JavaScript code. If it is determined that a branch would execute during normal operation of the browser (YES branch of block 408), at block 410 the method may include flagging each branch of the branching path that would execute during normal operation as a normal path. If it is determined that a branch would not execute during normal operation of the browser (NO branch of block 408), at block 412 the method may include flagging each branch of the branching path that would not execute during normal operation as a dark path. Method 400 may eventually continue to block 414, where method 400 may stop.

By going through each branching path in this way and identifying both the normal and dark paths, method 400 may determine the paths that would not be taken during normal execution of the browser, as described above, and may also determine unknown normal paths as well. For example, there may be a path that is intended to occur, but may rarely happen due to the inputs required. Since every possible input and path may not be known, enumerating each branch in the plurality may allow for the identification and execution of each branching path in the JavaScript code.

Figure 5:
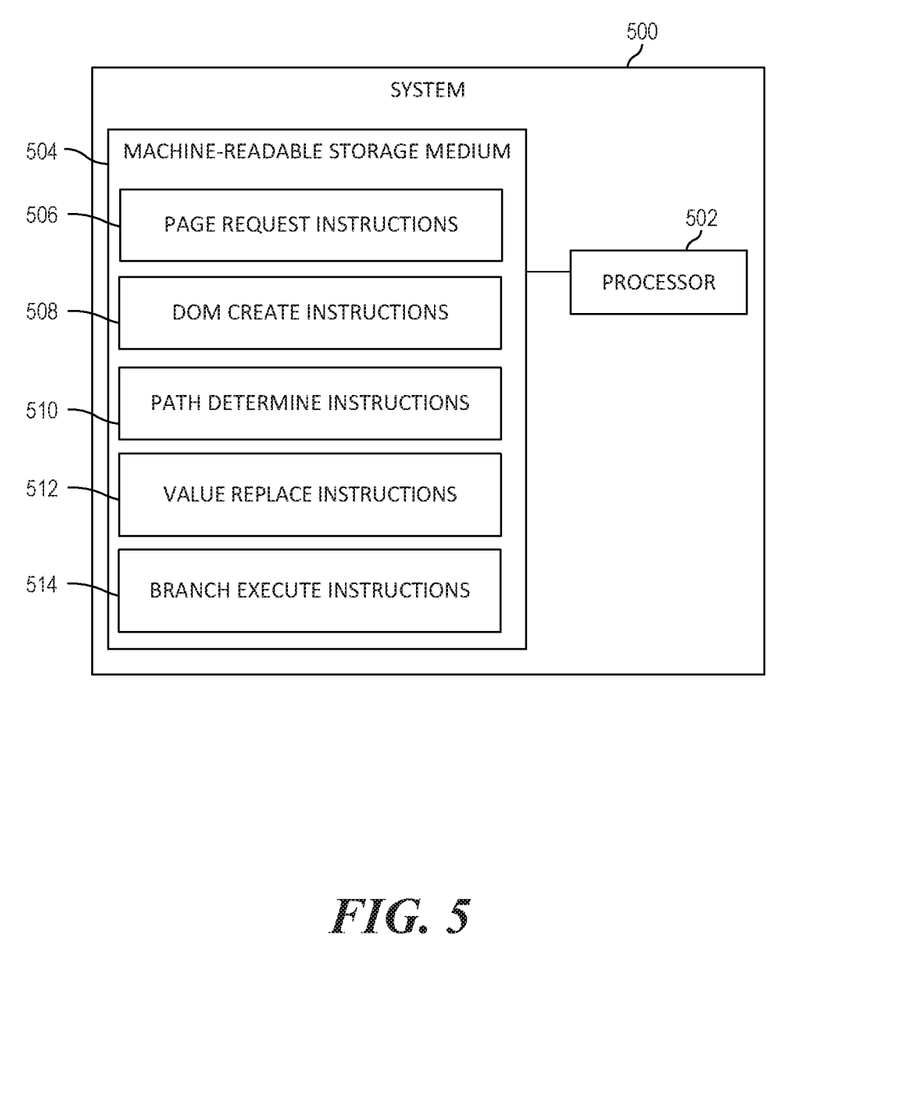
FIG. 5 is a block diagram of an example system for JavaScript path enumeration.

FIG. 5 is a block diagram of an example system 500 for JavaScript path enumeration. System 500 may be similar to environment 100 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512 and 514 to perform JavaScript path enumeration. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, page request instructions 506, when executed by a processor (e.g., 502), may cause system 500 to request an HTML page structure including executable JavaScript code. DOM create instructions 508, when executed by a processor (e.g., 502), may cause system 500 to create a document object model (DOM) with a plurality of branch paths of executions of the executable JavaScript code. Path determine instructions 510, when executed by a processor (e.g., 502), may cause system 500 to determine a branching path, belonging to the plurality, with a value that would prevent at least one branch of the branching path to execute during correct browser execution. Value replace instructions 512, when executed by a processor (e.g., 502), may cause system 500 to replace the value with a second value.

In some aspects, determining a branching path with a value that would prevent at least one branch of the branching path to execute during correct browser execution may include identifying a branch of the branching path corresponding to a hard coded value in the HTML page structure and determining that the branch of the branching path that would not execute during normal operation of a browser executing the JavaScript corresponds to a value other than the hard coded value.

In some aspects, determining a branching path with a value that would prevent at least one branch of the branching path to execute during correct browser execution may include determining that the branching path has two possible branches, determining that a first branch of the possible branches would not execute during normal operation of a browser executing the JavaScript code, identifying a value corresponding to the first branch and identifying the first branch as a dark path.

Branch execute instructions 514, when executed by a processor (e.g., 502), may cause system 500 to execute the branch using the second value. The execution may be performed by a headless browser that emulates functionality of a browser without generating a graphic user interface. The browser may a plurality of operational modes, each operational mode corresponding to the simulation of a different browser environment. The DOM may be adjusted based on the second value.

The foregoing disclosure describes a number of examples for JavaScript path enumeration. The disclosed examples may include systems, devices, computer-readable storage media, and methods for JavaScript path enumeration. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method executed by at least one processor, comprising:
   receiving code corresponding to an HTML page structure including a plurality of executable JavaScript code;
   enumerating a branching path in the JavaScript code;
   determining a branch of the branching path that would not execute during normal operation of a browser executing the JavaScript code;
   generating an artificial condition for the branch;
   executing the branch using the artificial condition;
   receiving an initial document object model (DOM) corresponding to the HTML page structure and the plurality of executable JavaScript code;
   adjusting the initial DOM based on the artificial condition for the branch;
   tracking state changes to the initial DOM by recording adjustments made to the initial DOM, including the adjusting of the initial DOM based on the executing of the branch using the artificial condition;
   after the adjusting of the initial DOM, restoring the initial DOM;
   determining a second branch of the branching path that would execute during the normal operation of the browser executing the JavaScript code; and
   adjusting the initial DOM based on the second branch.

2. The method of claim 1, wherein determining that the branch of the branching path would not execute during the normal operation of the browser executing the JavaScript code comprises identifying, by the at least one processor, a branch of the branching path corresponding to a hard coded value in the HTML page structure.

3. The method of claim 1, wherein the executing of the branch using the artificial condition is performed by a headless browser that emulates functionality of the browser without generating a graphic user interface.

4. The method of claim 3, comprising:
   executing, by the at least one processor, the branch using the artificial condition in a plurality of operational modes, each operational mode corresponding to a simulation of a different browser environment.

5. The method of claim 1, comprising:
   determining, by the at least one processor, a plurality of branching paths in the JavaScript code;
   enumerating, by the at least one processor, the plurality of branching paths in the JavaScript code;
   determining, by the at least one processor, a branch of each respective branching path that would not execute during the normal operation of the browser executing the JavaScript code;
   flagging, by the at least one processor, each branch of the respective branching path that would execute during the normal operation as a normal path; and flagging, by the at least one processor, each branch of the respective branching path that would not execute during the normal operation as a dark path.

6. The method of claim 1, comprising:
determining, by the at least one processor, a break point during the executing of the branch using the artificial condition, where the JavaScript code interacts with a web server.

7. The method of claim 1, comprising:
determining, by the at least one processor, that the branching path has two possible branches;
determining, by the at least one processor, that a first branch of the possible branches would not execute during the normal operation of the browser executing the JavaScript code; and
identifying, by the at least one processor, the first branch as a dark path.

8. A system comprising:
a processor; and
a non-transitory storage medium storing instructions executable on the processor to:
receive code corresponding to an HTML page structure;
enumerate a plurality of branching paths of executable JavaScript code included in the HTML page structure;
determine, for a first branching path of the plurality of branching paths, a given branch of the first branching path that is not intended to execute during runtime conditions;
generate, for the given branch, an unintended value for the given branch;
execute the given branch using the unintended value;
receive an initial document object model (DOM) corresponding to the HTML page structure and the JavaScript code;
adjust the initial DOM based on execution of the given branch using the unintended value;
track state changes to the initial DOM by recording adjustments made to the initial DOM, including the adjusting of the initial DOM based on executing the given branch using the unintended value;
after the adjusting of the initial DOM, restore the initial DOM;
determine a further branch of the first branching path that would execute during the runtime conditions; and
adjusting the initial DOM based on the further branch.

9. The system of claim 8, wherein determining that the given branch of the first branching path would not execute during the runtime conditions comprises identifying a branch that corresponds to a hard coded value in the HTML page structure and determining that the given branch has a value other than the hard coded value.

10. The system of claim 8, wherein the instructions are executable on the processor to:
determine a break point where the JavaScript code interacts with a web server.

11. The system of claim 8, wherein the instructions are executable on the processor to:
determine that the first branching path has two possible branches;
determine that a first possible branch of the two possible branches is not intended to execute during the runtime conditions; and
identify the first possible branch as a dark path.

12. The system of claim 8, wherein the instructions are executable on the processor to execute the given branch using the unintended value using a headless browser that emulates functionality of the headless browser without generating a graphic user interface.

13. A non-transitory machine-readable storage medium encoded with instructions, the instructions upon execution causing a system to:
receive an HTML page structure including executable JavaScript code;
create a document object model (DOM) with a plurality of branching paths of executions of the executable JavaScript code;
determine a first branching path, of the plurality of branching paths, with a first value that would prevent a branch of the first branching path from executing during correct browser execution;
replace the first value with a second value;
execute the branch using the second value;
adjust the DOM based on executing the branch using the second value;
track state changes to the DOM by recording adjustments made to the DOM, including the adjusting of the DOM based on executing the branch using the second value;
after the adjusting of the DOM, restore the DOM;
determine a further value that would cause the branch to execute during the correct browser execution; and
adjust the DOM based on the further value.

14. The non-transitory machine-readable storage medium of claim 13, wherein the instructions upon execution cause the system to:
enumerate the plurality of branching paths in the JavaScript code;
determine a branch of each respective branching path that would execute during the correct browser execution;
flag the branch of the respective branching path that would execute during the correct browser execution as a normal path; and
flag the branch of the respective branching path that would not execute during the correct browser execution as a dark path.

* * * * *